March 19, 1929. J. E. KOBERNIK 1,705,669
GAS, OIL, AND WATER SEPARATOR
Filed Jan. 19, 1926 3 Sheets-Sheet 1

Inventor:
J. E. Kobernik.
by Hazard and Miller
Attorneys

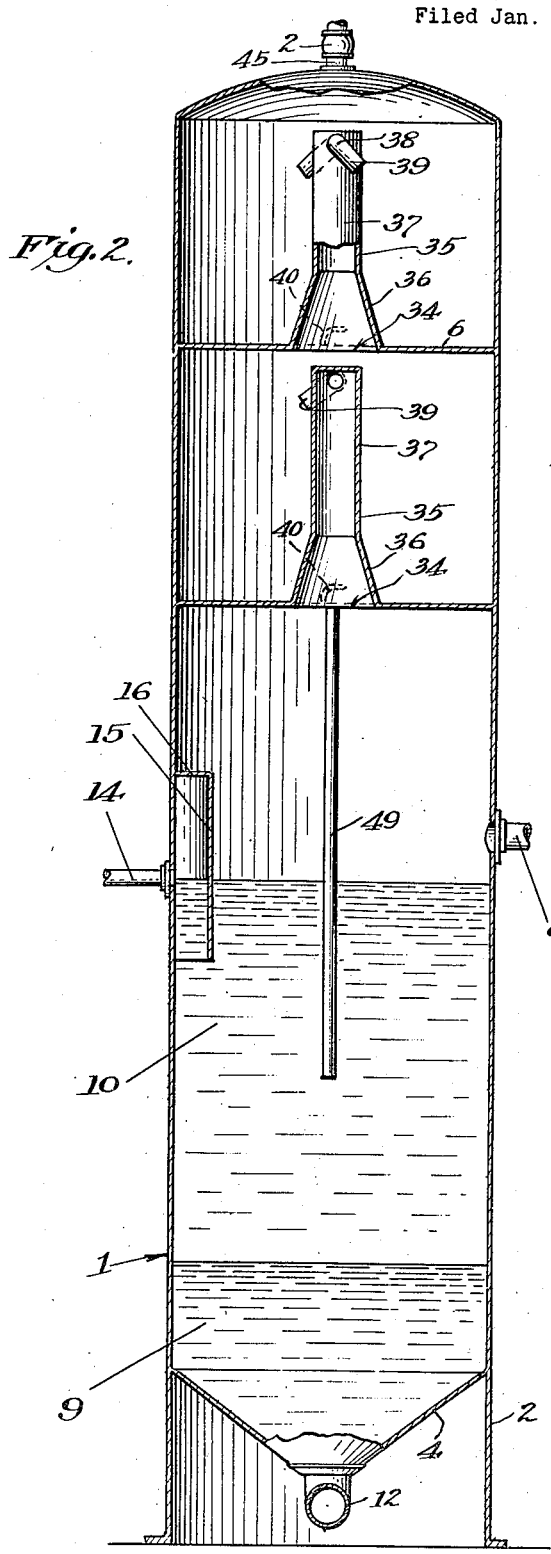
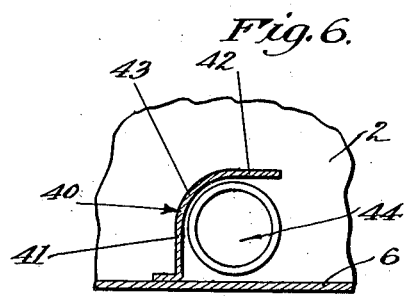
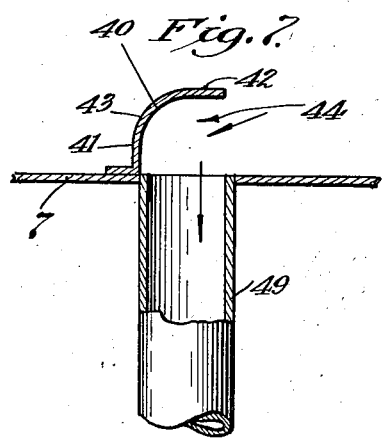

March 19, 1929.  J. E. KOBERNIK  1,705,669
GAS, OIL, AND WATER SEPARATOR
Filed Jan. 19, 1926.  3 Sheets-Sheet 3
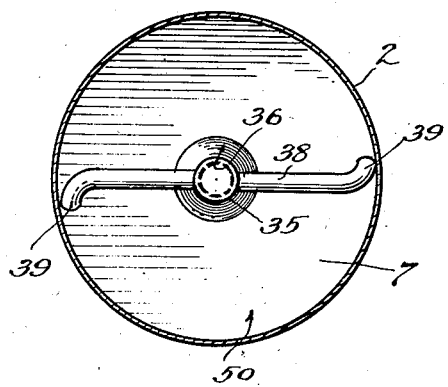
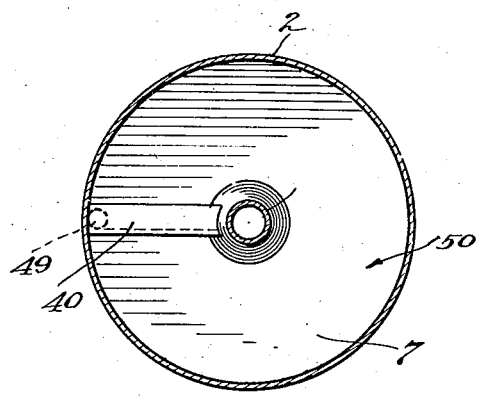
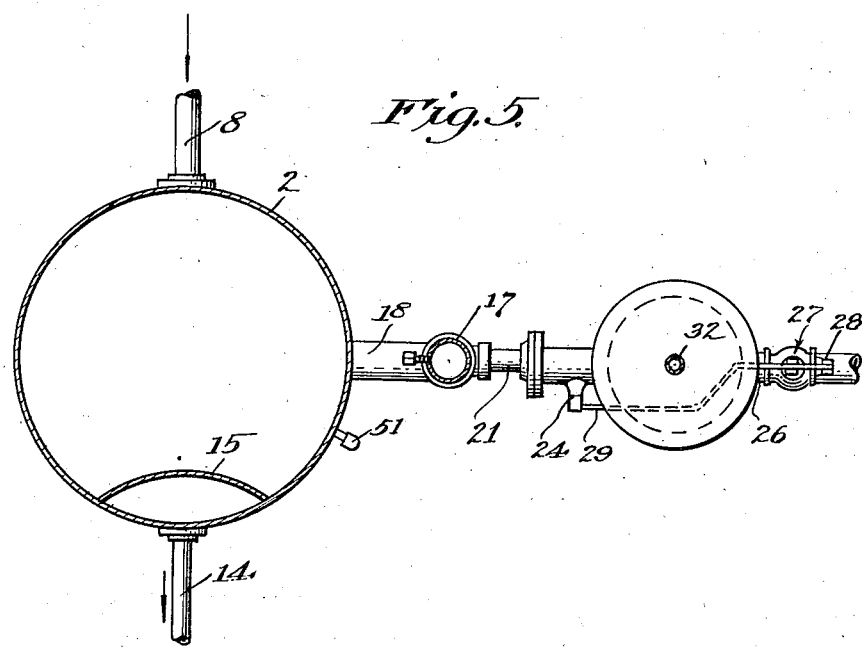

Patented Mar. 19, 1929.

1,705,669

UNITED STATES PATENT OFFICE.

JULIUS E. KOBERNIK, OF FULLERTON, CALIFORNIA, ASSIGNOR TO NEWTON PROCESS MANUFACTURING CO., OF FULLERTON, CALIFORNIA, A CORPORATION OF CALIFORNIA.

GAS, OIL, AND WATER SEPARATOR.

Application filed January 19, 1926. Serial No. 82,341.

My invention is a gas, oil and water separator adapted to separate the gas, oil and water from oil issuing from an oil well.

An object of my invention is a gas, oil and water separator adapted to receive the oil directly from an oil well without having it pass through the usual flow nipple or as it is sometimes termed the bean. The volume of the flow instead of being regulated by such devices is controlled by a back pressure with suitable pressure regulators. A feature therefore of the invention is the elimination of the usual emulsion which takes place when the oil containing more or less water and gas passes through the ordinary flow nipple or flow bean.

An object of my invention is to separate the gas, oil and water under pressure to separate the oil and water by the differences of specific gravity and to separate the oil and gas by a centrifugal action without moving mechanical means.

In my invention I utilize a tank having an oil and water chamber in the lower portion, the oil from the well flows into this tank, the oil and water separating by gravity. The gas passes upwardly through a series of centrifugal separation gas chambers in which the gas issuing from nozzles is discharged in such a direction as to follow a circular path around the tank; thus separating the oil from the gas. This oil flows downwardly into the body of oil in the lower portion of the tank.

A water level pipe is connected to the tank at one end below the water level and at the other end above the oil level. An outflow water pipe is connected to the water level pipe and has an ordinary float valve device connected thereto to run the water off after it has reached a certain predetermined level. The valve device is connected to the tank above the oil level so that the outflow water is at the same pressure as the gas in the tank.

Specific features of my invention are in the type of outflow water control, the oil and gas separator device in the centrifugal separating chambers and in the various other details.

My invention will be more readily understood from the following description and drawings, in which;

Fig. 2 is a vertical section at right angles to Fig. 1, on the line 2—2 of such figure, taken in the direction of the arrows.

Fig. 3 is a horizontal section of Fig. 1, on the line 3—3 of Fig. 1, taken in the direction of the arrows.

Fig. 4 is a horizontal section on the line 4—4 in the direction of the arrows, of Fig. 1.

Fig. 5 is a horizontal section on the line 5—5 of Fig. 1, in the direction of the arrows.

Fig. 6 is a vertical detail section on the line 6—6 of Fig. 1, in the direction of the arrows.

Fig. 7, is a vertical detail section on the line 7—7 of Fig. 1.

Figure 1:
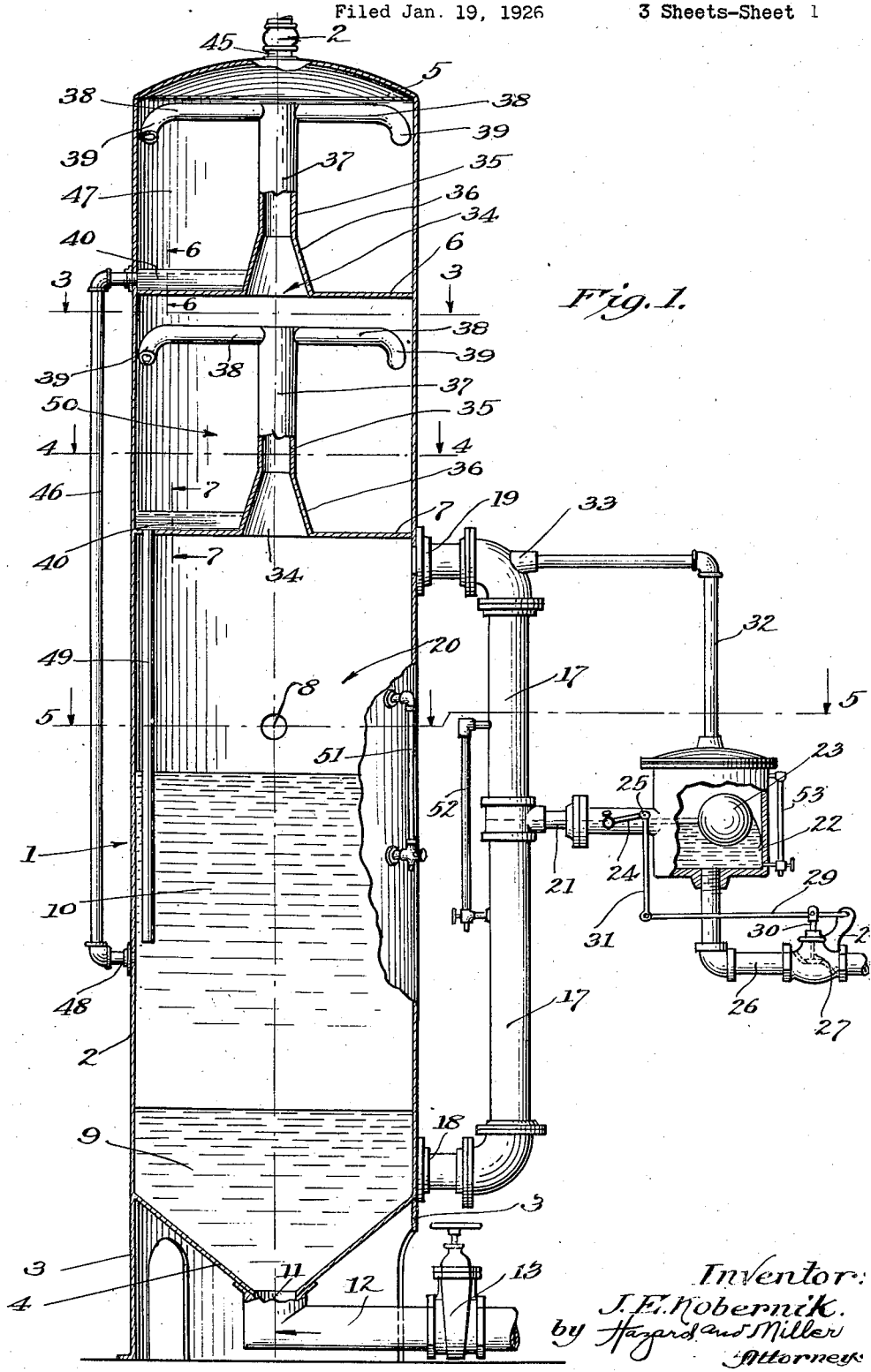
Figure 1 is a vertical section of my gas, oil and water separator.

Referring particularly to Figs. 1 and 2, my separator comprises a tank designated generally by the numeral 1 and being formed preferably cylindrical; the tank also being of considerable height compared to its diameter. The tank is formed with vertical walls 2 forming a shell, supporting legs 3, a cone-shaped drainage bottom 4 and a domed cap 5. A pair of diaphragms 6 and 7 are positioned transversely of the shell. The oil mixture is fed into the shell through a pipe 8 in the side of the shell, this mixture containing the gas, oil and water as it comes directly from an oil well. The oil and water separate by gravity, the water being indicated by the numeral 9 and the oil by the numeral 10. A drainage outlet 11 is formed at the base of the drainage bottom 4 having a pipe 12 with a valve 13 therein for clearing off the sediment or the like. An oil outflow pipe 14 establishes the oil level and a baffle 15 having a closed top 16 is secured on the inside of the shell and prevents the inflowing mixture of gas, oil and water from blowing directly out of the shell.

The outflow of the water is controlled substantially as follows, having reference particularly to Figs. 1 and 5. A water level pipe 17 is connected to the lower end of the shell as indicated at 18 and also to the shell at the point 19 below the lower diaphragm 7, the end 18 being below the water level and the end 19 being in the gas chamber 20. An outflow pipe 21 is connected to the water level pipe and establishes the level of water rising in such pipe. A water flow control box 22 is directly connected to the outflow pipe 21, being positioned in the same horizontal alinement with the connection of the outflow pipe to the water level pipe. A float 23 is mounted therein and operates a lever 24 through the medium of the rock shaft 25.

A water outlet pipe 26 is connected to the base of the water box 22 and has a valve 27 therein. An arm 28 extends upwardly from the valve and swivelly supports one end of a valve rod 29. This latter is connected to the valve stem 30. A link 31 connects the lever 24 and the valve rod 29. A gas pipe 32 is connected from the upper end of the water box to the upper end of the gas chamber 20 and is shown as being attached to the upper end of the water pipe 17 at the point 33.

It will therefore be seen that the level of the oil outlet is predetermined, that the level of the water outlet is also substantially predetermined and that the water in the water box 22 is under the same gas pressure as the oil body 10.

Each of the diaphragms 6 and 7 has a gas opening 34 therethrough and an upwardly extending stack 35 formed with a tapered section 36 adjacent the diaphragms and an upper section 37 closed at the top. Lateral gas pipes 38 extend outwardly from the stack at its upper portion and have curved nozzles 39 bent into a curve concentric with the wall of the shell and also pointing somewhat downwardly.

Each of the diaphragms has a baffle 40 formed of a curved plate having a vertical back wall 41 and a horizontal top wall 42 with a curved section 43 therebetween. These baffles extend from the outer wall of the shell radially inwardly to the tapered section 36 of the stack. The open sides 44 of the baffles face the swirling gas discharged from the nozzles 39. A gas outlet pipe 45 is connected to the cap 5. It is intended that this outlet be controlled by a pressure valve so that the pressure of gas in the tank may be suitably regulated.

An oil pipe 46 leads downwardly from the upper gas separating chamber 47 preferably on the outside of the tank and through a connection 48 to the body of oil. A second oil pipe 49 leads downwardly from the second centrifugal oil separating chamber 50 and discharges in the body of the oil. This pipe is preferably inside the tank. The pipe 46 is carried outside of the tank so that it will not interfere with the centrifugal type of oil separation in the chamber 50.

Liquid level gauges 51, 52 and 53 are provided on the outside of the shell for the oil level on the water level pipe for the water level and for the water float control box.

The manner of operation of my gas, oil and water separator is substantially as follows:

The well oil having gas and water incorporated therein is led through the intake pipe 8 preferably direct from the well and under the pressure it developed. The mixture spreads on the body of oil 10 the water on account of its greater specific gravity settling to the bottom of the tank. The gas rises upwardly and passes first through the stack 35 and being discharged at a considerable velocity, through the curved nozzles 39 is given a swirling action in the lower centrifugal separating chamber 50. This action throws the particles of oil carried by the gas outwardly and as the path of the gas is up these particles drop to the diaphragm 7. The upstanding baffle being opposed to the direction of the swirl catches some of the particles of oil. New oil collected continuously drains through the oil pipe 49 into the body of the oil. The gas then passes upwardly through the stack in the upper separating chamber where the action is substantially the same as in the lower chamber.

The oil pipe 46 is connected close to the diaphragm 6 so that any oil collecting readily flows into this pipe and is discharged in the body of the oil, the clean gas escaping through the outlet 45.

The oil level is kept constant by means of the oil outlet pipe 14 being at a fixed level, or if desired the oil outlet pipe may be restricted by a valve or the like and raise the oil level to any suitable height desired.

The water rises in the water level pipe 17 until it obtains a height therein due to the hydrostatic pressure of the body of water 9 and the body of oil 10. The oil outflow pipe 21 is placed at the proper level to drain the oil which flows into the water float control box 22. The pressure of gas in the water level pipe in the tank and in the water box is kept the same by means of the connecting pipe. When the water level rises in the water box the float 23 controlling the valve 27 opens such valve to allow the water to drain off, keeping a substantially constant level by the rise and fall of the float controlling the valve. This makes a gas tight outlet for the water.

It will be noted that my gas, oil and water separator is of a simple construction, having substantially no moving part liable to become out of order or to become clogged with oil. I may utilize as many centrifugal oil separating chambers as necessary to properly dry the gas. Therefore, I secure a proper separation of the gas, the oil and the water.

It will be manifest that my invention may be changed in general construction and in specific details to suit different types of installations and also to adapt it for handling other oils than those directly derived from oil wells if desired. Such changes would be within the spirit of my invention as set forth in the description, drawings and claims.

Having described my invention, what I claim is:

1. A gas, oil and water separator comprising in combination an elongated cylindrical tank having a plurality of partitions in the upper portion of the tank, means to feed an oil mixture into the tank, there being openings in said partitions, stacks extending upwardly from said openings, lateral gas pipes at the upper ends of said stacks, nozzles discharging concentrically with the cylinder connected to said lateral pipes, oil drain pipes from said partitions and outfeed means for oil, gas and water.

2. A gas, oil and water separator comprising in combination an elongated cylindrical tank having a plurality of diaphragms in the upper portion of the tank having openings, single stacks extending upwardly from said openings, lateral gas pipes connected to the upper end of said stacks having nozzles discharging concentrically with the cylindrical tank and inclined downwardly, baffles positioned above said diaphragms, the baffles being concave and their concave surface being impinged by the flow of gas, drainage pipes from said diaphragms, means to feed an oil mixture into the tank and outlet means for oil, gas and water.

3. A gas, oil and water separator as claimed in claim 2, in which the stacks are composed of single pipes having a lower tapered section and an upper cylindrical section, the gas pipes extending radially outwardly from the upper end of the cylindrical portion.

In testimony whereof I have signed my name to this specification.

JULIUS E. KOBERNIK.